United States Patent [19]
Berkovich et al.

[11] Patent Number: 6,145,071
[45] Date of Patent: *Nov. 7, 2000

[54] MULTI-LAYER MULTI-PROCESSOR INFORMATION CONVEYOR WITH PERIODIC TRANSFERRING OF PROCESSORS' STATES FOR ON-THE-FLY TRANSFORMATION OF CONTINUOUS INFORMATION FLOWS AND OPERATING METHOD THEREFOR

[75] Inventors: Semyon Berkovich; Efraim Berkovich, both of Rockville, Md.; Murray H. Loew, Alexandria, Va.

[73] Assignee: The George Washington University, Washington, D.C.

[*] Notice: This patent issued on a continued prosecution application filed under 37 CFR 1.53(d), and is subject to the twenty year patent term provisions of 35 U.S.C. 154(a)(2).

[21] Appl. No.: 08/204,996

[22] Filed: Mar. 3, 1994

[51] Int. Cl.⁷ .................................................. G06H 15/00

[52] U.S. Cl. .................................................. 712/18; 712/11

[58] Field of Search ................... 395/800, 325, 395/775; 712/18, 19, 11, 13, 16

[56]                  References Cited

U.S. PATENT DOCUMENTS

| | | |
|---|---|---|
| 3,226,688 | 12/1965 | Amdahl et al. . |
| 3,226,689 | 12/1965 | Amdahl et al. . |
| 3,962,706 | 6/1976 | Dennis et al. . |
| 4,025,771 | 5/1977 | Lynch, Jr et al. . |
| 4,065,808 | 12/1977 | Schomberg et al. ..................... 395/325 |
| 4,215,401 | 7/1980 | Holsztynski et al. .................... 382/304 |
| 4,428,048 | 1/1984 | Berlin, Jr. ................................ 395/775 |
| 4,484,349 | 11/1984 | McCubbrey .............................. 382/49 |
| 4,514,807 | 4/1985 | Nogi ........................................ 395/800 |
| 4,709,327 | 11/1987 | Hillis et al. .............................. 395/375 |
| 4,720,780 | 1/1988 | Dolecek .................................... 712/18 |
| 4,725,973 | 2/1988 | Matsuura et al. . |
| 4,750,112 | 6/1988 | Jones et al. . |
| 4,760,519 | 7/1988 | Papworth et al. . |
| 4,777,594 | 10/1988 | Jones et al. . |
| 4,794,517 | 12/1988 | Jones et al. . |
| 4,803,615 | 2/1989 | Johnson . |
| 4,814,978 | 3/1989 | Dennis . |
| 4,814,980 | 3/1989 | Peterson et al. . |
| 4,833,599 | 5/1989 | Colwell et al. . |
| 4,860,249 | 8/1989 | Nicely et al. . |
| 4,884,193 | 11/1989 | Lang ........................................ 712/18 |
| 4,891,751 | 1/1990 | Call et al. ............................... 395/800 |
| 4,891,787 | 1/1990 | Gifford . |
| 4,926,323 | 5/1990 | Baror et al. . |
| 4,937,784 | 6/1990 | Masai et al. . |
| 4,958,273 | 9/1990 | Anderson et al. ....................... 395/800 |
| 5,021,945 | 6/1991 | Morrison et al. . |
| 5,109,356 | 4/1992 | Lawton .................................... 364/726 |
| 5,170,463 | 12/1992 | Fujimoto et al. ......................... 395/11 |
| 5,218,680 | 6/1993 | Farrell et al. . |
| 5,278,975 | 1/1994 | Ishinata et al. .......................... 395/550 |
| 5,506,998 | 4/1996 | Kato et al. ................................. 717/29 |

OTHER PUBLICATIONS

Proceedings of the 35th Midwest Symposium on Circuits and Systems, The Capital Hilton, Washington, D.C., Aug. 9–12, 1992, pp. 8–11.

Parbase–90, International Conference on Databases, Parallel Architectures, and Their Applications, IEEE Computer Society Press, Los Alamitos, California, Mar. 7–9, 1990, pp. 4–7.

*Primary Examiner*—Larry D. Donaghue
*Attorney, Agent, or Firm*—McDermott, Will & Emery

[57]                  ABSTRACT

In a multi-processor computing system, a multi-layer architecture is described in which each layer has a plurality of dual ported microprocessors, one port of which receives data for processing and the other port of which is utilized for unloading or passing data to a subsequent layer. If the processing cannot be completed prior to the time allotted for the next load cycle for a particular processor, the processing is interrupted, the state of the processor currently engaged in the processing is stored in the data and the state of the processor is transferred to a processor of a subsequent layer where processing resumes as if no interruption had occurred.

14 Claims, 2 Drawing Sheets

MULTI-LAYER MULTI-PROCESSOR INFORMATION CONVEYOR WITH PERIODIC TRANSFERRING OF PROCESSORS' STATES FOR ON-THE-FLY TRANSFORMATION OF CONTINUOUS INFORMATION FLOWS AND OPERATING METHOD THEREFOR

TECHNICAL FIELD

The invention is related to computer systems and more particularly to multi-processor computer systems and methods having a multi-layer computer architecture.

The invention is directed to solving the problem of processing intensive volumes of information in an uninterrupted manner.

A prominent example of this problem is represented by NASA's Earth Orbiting System (EOS) which is intended to send down more than one trillion bytes of data per day for fifteen years. Another example of processing very intensive information flow is given by experiments in high energy physics. For many operations, dividing the solution of the problem into two phases, namely collecting data in a first phase and subsequently processing the data in a second phase may not be suitable because of time required to retrieve and load large amounts of data. Similar problems occur in a variety of signal processing applications.

Many of the approaches taken to handle intensive volumes of data rely on increasing the processing power of a single computer. There is, however, a technological limit to how fast a single computer can operate.

Some of the approaches taken by the prior art to handle intensive volumes of data use multiple processors. However, as the number of processors increased in the prior art, the complexity of system supervision and overhead required to handle the additional processors also increased resulting in an upper limit on the effective processing power of prior art multiple processor architectures. Further, special provisions were required to permit software to run on multiple processors and buffer size often limited the tasks which could be undertaken by multiprocessor systems of the prior art.

Processing intensive continuous flows of data is one of the challenging problems in many engineering and scientific applications.

DISCLOSURE OF THE INVENTION

One of the objects of the invention, therefore, is to make available a multi-processor computing system which permits processing of intensive volumes of information in an uninterrupted manner.

Another object of the invention is to permit data to be collected and processed on-the-fly into final form for storage.

Another object of the invention is to structure a computer architecture so that processing power can be increased by adding processors without loss of efficiency caused by undue complexity and by system supervision and overhead.

Another object of the invention is to permit the processors of a multi-processor computer system to utilize off the shelf software.

Another object of the invention to accommodate variable length data in a multi-processor computing system.

The invention is directed to a multi-processor computing system which has a plurality of layers, each layer having at least three dual ported processors. The system has a plurality of busses, with each bus supervised by a supervisory processor. One of those busses serves as an input bus for the first layer of processors and another of the busses serves as an output bus. One port of each processor of a first layer is connected to the input bus and one port of each processor of a last layer is connected to the output bus. One or more intermediate busses connect one port of processors of a preceding layer to one port of processors of a succeeding layer. As a result, incoming data can be allocated to processors of a first layer and transferred sequentially to processors of subsequent layers for processing. Supervisory processors supervise each layer bus and all supervisory processors, except the one supervising the input bus are linked over a supervisory linking bus.

Mass storage devices are connected to said supervisory linking bus and provide I/O to all layers except the input layer. Output data can be recirculated to the input, if desired.

The supervisory processor of each bus connected to layer processors sequentially loads data into the memory of respective layer processors and, since data is continuously arriving, if processing of incoming data is not completed by the time it becomes necessary to load the next quantity of data to a processor on the input bus, the operating state of that processor is transferred as required to a processor of a subsequent layer for continuation of processing from the point in program execution at which program execution was interrupted for the transfer.

Each layer processor receives not only a copy of the data block which it must process, but the data block of a logically adjacent processor as well.

The invention is also directed to a method of operating a multi-processor computing system of the type described to load incoming data sequentially to processors of the first layer for processing, transfer the operating state of each processor of said first layer to a corresponding processor of a subsequent layer if incoming data is ready to be loaded to said processor of said first layer and processing has not been completed, and to operate the corresponding processor of the subsequent layer to resume processing beginning with the operating state received from the processor of said first layer.

The invention is also directed to a method of operating a multi-processor computing system of the type described to load incoming blocks of data sequentially to respective processors of said first layer for processing, and to also load to each of said respective processors a copy of a block of data to be processed by a logically adjacent processor.

The invention presented herein permits processing power to be increased, not by making processors more powerful, but by a specific multiple layer, multiple bus architecture which allows the computational power of the computing system to be increased by merely increasing the number of processors. The architecture frees the system from the limits imposed by complexity, overhead and buffer size of the prior art systems.

The invention also employs a scheme which handles intensive real time processing while permitting at the same time input/output to mass storage devices.

The invention also allows existing software to be utilized without modification in the processors of a multiprocessor environment.

These and other objects of the invention are illustrated in the drawings in which.

DETAILED DISCLOSURE OF THE INVENTION

The invention represents a flexible architecture for on-the-fly processing of heavy flows of information. The system is assembled from substantially identical layers. Each layer consists of a plurality of dual-port microprocessors which constitute one layer of information processing. Each processor is connected by one port to a layer bus and by the other port to a bus of the next layer or to an output bus. Each bus has one designated supervisor processor which is connected by one port to the layer bus and by the other port to a supervisory linking bus for, inter alia handling input/output.

The system functions by loading the incoming flow of information sequentially into processors of the first layer. While loading takes place in other processors of the layer, the non-loading processors can perform their data transformation functions. As the time arrives for the processor to be loaded, it relocates its data and processing status to the next layer where processing continues. By varying the number of processors in the modules, one can control the amount of time allotted to processing at each layer—more processors implies greater processing time available for each. The number of layers to be used likewise depends on the application, but the result can be withdrawn from any layer by means of the supervisor processor. The supervisor processor also serves to retrieve any external information needed by a particular process.

Input and output controllers handle input and output information flows. The external mass memory handles requests from the supervisor processors. This mass memory can be a disk array or other mass storage memory. The output unit can also serve as an accumulator of intermediate results if the length of the conveyor is insufficient to complete processing. In this case, the output unit can feedback the partially processed data through the input controller.

Figure 1:
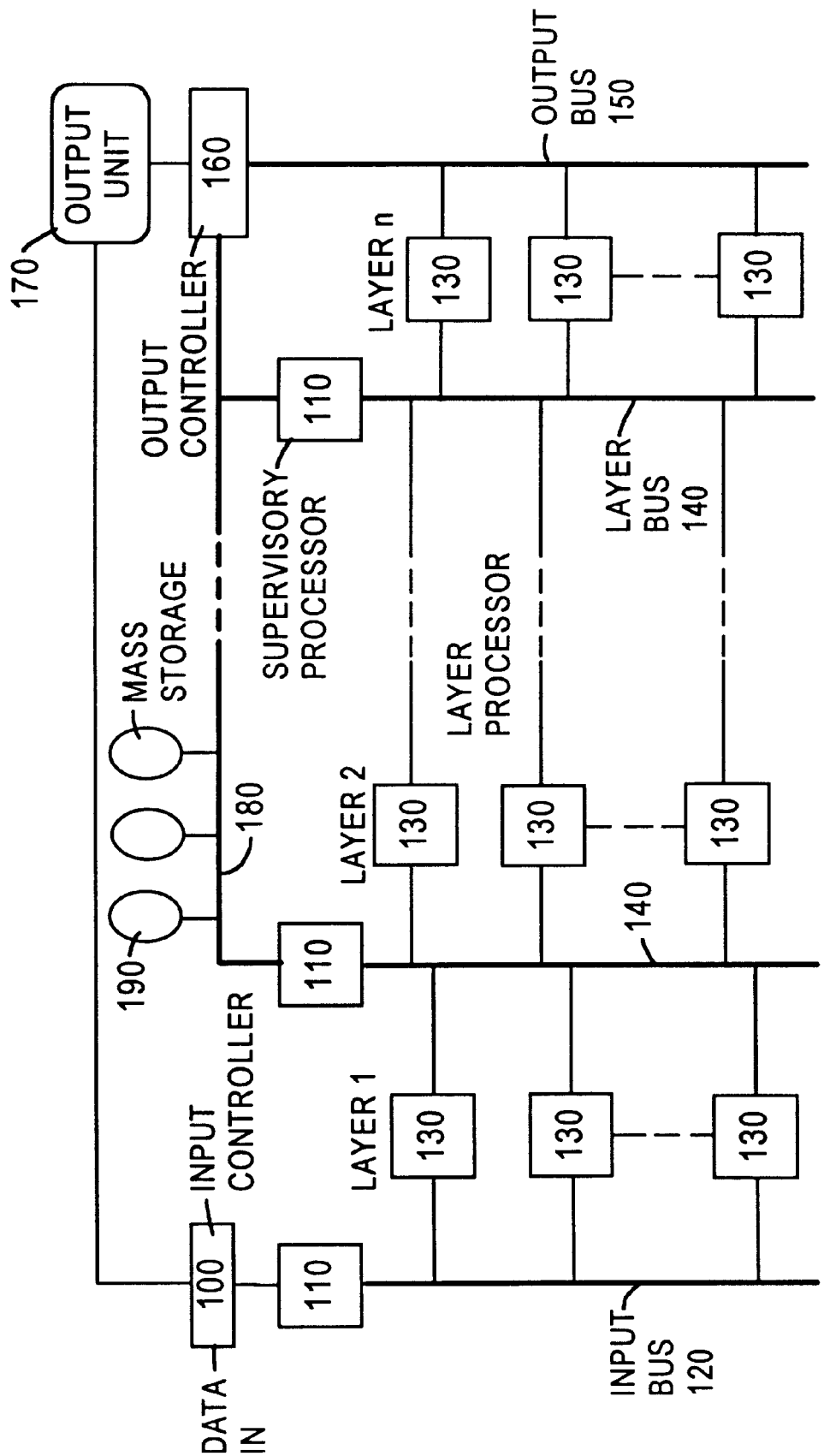
FIG. 1 represents a block diagram of the multi-processor computer system of the invention.

Referring to FIG. 1, data is applied to input bus 120 of the multi-processor computing system for processing through an input controller 100 and supervisory processor 110. Each layer processor 130 experiences a cycle of operations consisting of, preferably, two load cycles, two processing cycles and one unload cycle although a more traditional load, process and unload sequence could be used. Processors of each layer begin their load cycles in a logical sequence but, preferably, the second load cycle of each processor overlaps the first load cycle of a subsequent processor in the sequence enabling data being loaded in said subsequent processor to be duplicate loaded in the preceding processor, for processing overlapping segments of information and variable length data. All load operations for a particular layer processor occur on one port of the dual-ported processor and all output operations (unload) occur on the other port.

Transfers between processors can occur in either of two modes. The first mode is a memory sharing mode and the second is a direct memory access (DMA).

In the memory sharing mode, all processors connected to a common bus, (e.g. 120, 140, 180) share a common memory space which is subdivided into regions associated with each processor. When a processor desires to transfer data to a subsequent processor over the bus, data is transferred from memory space belonging to the originating processor into the memory space belonging to the destination processor.

In the DMA transfer mode, each processor has its own dedicated memory which is equipped with a DMA controller which permits DMA transfer between the bus and memory. With DMA capability, the particular processor serviced by a bus can write data directly to other processors' memory and receive data from other processors into their own memory.

When the conveyor is running, it is expected that the processors associated with the input bus will not have completed all processing required for the data sent to it by the time that the next set of data is ready to be loaded to that processor. In such a case, it becomes necessary to transfer processing that is ongoing in the first processor to a processor of a subsequent layer. This occurs in a manner analogous to a "context switch" used, for example, in multiprogramming environments running the UNIX operating system. When it becomes necessary for a processor to switch tasks, the operating state of the processor is captured by storing the contents of all registers, including the program counter, in memory (i.e., PUSHing the contents of registers onto a LIFO memory to be subsequently POPed off the top of the memory to restore the processor to its operational state prior to the PUSH.)

When transferring incomplete processing from one processor to another, the operating state of the first processor is captured in memory and transferred, together with the data to be processed to the destination processor during the originating processor's unload cycle. The originating processor transfers that information directly into the memory of the destination processor using either the DMA capabilities of the memory controller or the shared memory alternative, discussed above.

Application programs may be preferably distributed such that each processor contains a copy of the entire program utilized to process data or, alternatively, application programs may be partitioned into functional units and the functional units distributed to respective layers or processors within layers, depending on how the partitioning is done. Distributing entire programs to each processor has the advantage that existing software can be used without modification for the multi-processor environment.

The supervisory processors 110 of layers 2 through N are connected over supervisory linking bus 180. Supervisory linking bus 180 also services external mass memory 190 which could be for example, mass semiconductor storage, magnetic disk storage or optical disk technology. Layer processors can obtain input output from/to the external mass memory by way of the individual layer busses 140 and supervisory processors 110. This allows input/output to occur at any layer down the conveyor stream. When the last layer of the conveyor is reached, the layer processors 130 output their information directly to output bus 150 where it is either sent to output unit 170 or recycled over supervisory linking bus 180 to an earlier layer for additional processing. The output of output unit 170 is arranged to selectively permit the output data to be recycled back to the input if desired.

Figure 2:
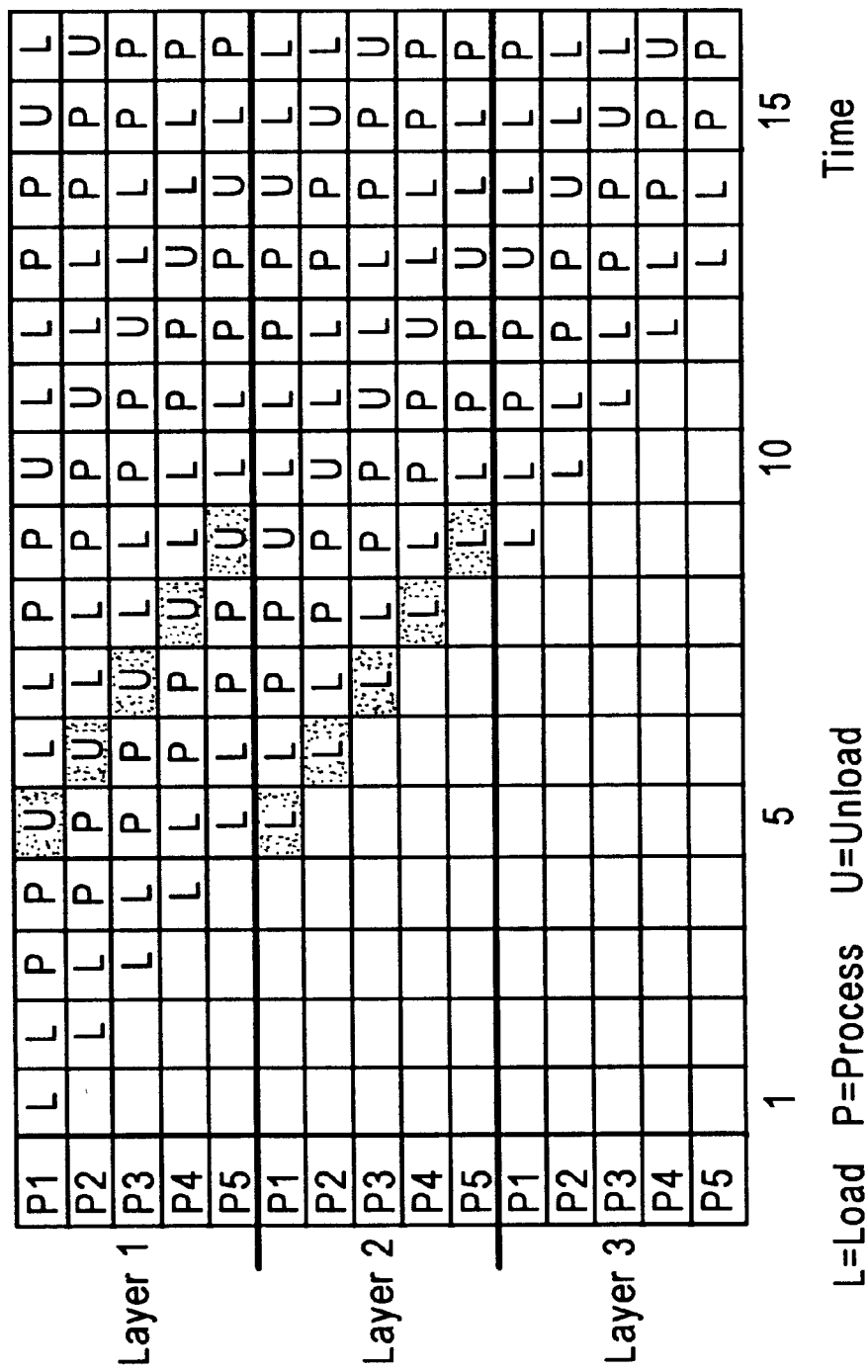
FIG. 2 depicts relative timing of operations in a multi-processor computing system of the invention when operating in a multi-layer mode.

FIG. 2 illustrates a plurality of cycles of operation for each of the processors in three typical layers. Considering layer 1, each processor receives data from the supervisory bus during sequential load cycles. Each processor operates, in this illustration, in a repetitive cycle of operations consisting of load, load, process, process and unload. In layer 1, at the end of its first cycle, processor 1 unloads its data onto an output bus for transfer to the corresponding processor (processor 1) of layer two. The shaded squares in FIG. 2 show the sequence of unload cycles of all processors in layer 1. The shaded squares in layer 2 show the loading of data from layer 1 into respective processors of layer 2 over the shared bus between layers 1 and 2.

Some operational examples of the use of the multi-processor computer system of the invention will now be described.

In a first example, matrix multiplication will be illustrated. Consider the problem where Matrix A is a 3×3 matrix, Matrix B is a 3×4 matrix and Matrix C rep resents the product of matrices A and B.

$$A = \begin{matrix} a_{11} \cdots a_{13} \\ a_{31} \cdots b_{31} \end{matrix} \quad (1)$$

$$B = \begin{matrix} b_{11} \cdots b_{14} \\ b_{31} \cdots b_{44} \end{matrix} \quad (2)$$

$$C = AB \quad (3)$$

$$C_{ik} = \sum_{i=1}^{n} a_{ij} b_{jk} \quad (4)$$

$$C_{11} = a_{11}b_{11} + a_{12}b_{21} + a_{13}b_{31} \quad (5)$$

Equation 1, above, shows a definition of Matrix A. Equation 2, above, shows a definition of Matrix B. Equation 3, above, shows a product in matrix notation and equation 4 shows the same thing in component notation.

When carrying out matrix multiplication, the entire Matrix A could be loaded into each processor during the first loading cycle and the entire Matrix B could be loaded to each processor during the second loading cycle. In the first layer, respective processors could multiply the first row of the A matrix times respective rows of the B matrix, sum the product of the components as shown in equation 5 and produce, respectively, one component of the output matrix which could then be sent to mass memory for intermediate storage at the time when the contents of the first layer is transferred to the second layer for the next step in the processing.

At the second layer, the second row of the A matrix could be multiplied by respective columns of the B matrix in respective processors of the second layer. The result of the multiplying and summing would be the second row of components of the resultant matrix which could be then, as before, stored on an interim basis in mass memory 190 and the processing transferred to layer 3 where the third row of the A matrix would be multiplied against respective columns of the B matrix and respective processors resulting in the final output row for the product matrix.

This approach utilizes the architecture to better advantage because additional processing can be ongoing in the earlier layers while matrix calculation is ongoing in a particular layer.

A second example of utilizing the architecture of the invention relates to image processing and more specifically to two dimensional image compression.

Assuming one has a digitized image represented in rows and columns of data, during load cycle 1 a first row could be loaded to processor 1. During load cycle 2 the contents of a second row of image information could be loaded in processor 2 and processor 1. During a third load cycle, a third row of image data could be loaded to processor 3 and replicated in processor 2. This process would continue until the number of processors on the bus of layer 1 had been loaded.

In terms of processing operations, each processor may do a run length encoding calculation for the row of data it is intended to operate on in one processing cycle and during a second processing cycle could accumulate partial run length information based on a comparison between the information in the row the processor is operating on and the information received redundantly which is intended to be operated on by the adjacent processor. This represents partial run length encoding data in the column direction. The output of the first layer then would contain run length encoded horizontal information for a number of lines equal to the number of processors in the layer as well as partial run length information with respect to a number of columns equal to the number of processors in the layer. Intermediate results can be accumulated in the external mass memory and retrieved for calculation of the final two-dimensional run length encoded image.

A third application relates to intensive transaction oriented database processing in which the transactions are characterized by bursty arrivals. As transactions arrive at the input controller, they are assigned to processors of the first layer respectively.

In the prior art, when a large number of requests for I/O would arrive, they would be queued up in the memory controllers of the I/O devices which would result in delays in processing. That is, each processor would normally have to cease receiving incoming data until its request for I/O was satisfied and the processing completed and the results unloaded.

In the architecture of the invention, a request for I/O can be sent to the mass memory over supervisory processor 110 of the second layer and the processors of the second layer assume responsibility for receiving the answer back from the external mass memory while new information is being loaded into the first layer. If responses have not been received by the time to unload the processors of the second layer, the handling of the I/O request can be passed to processors of subsequent layers until the results have been received. This allows incoming data to be received continuously regardless of I/O delays which might result from various forms of storage.

A final example illustrates operation of the invention when handling variable length data. The example will be illustrated by reference to a natural language processing application. Sentences vary in length from very short to very long. It is often desirable to operate on individual sentences as units for processing. In the architecture of the invention shown in FIG. 1, raw text could be loaded sequentially into the multi-layer conveyor by input controller 100, supervisory processor 110 and input bus 120. The duplicate data loading mode described above could be utilized. After data is loaded into a processor, the processor examines the data for an end-of-sentence indication. If an end-of-sentence indication is located, the processor will schedule for output to a processor of the second layer all data between either a previous end-of-sentence indication or the beginning of text and the end-of-sentence indication. If no end-of-sentence indication is found before the end of the data allocated to that processor for processing, control will pass to an adjacent processor. In this manner, sentences can be identified which extend across one or more processors.

In the second layer, processors are allocated to individual sentences. In this instance, when a sentence is found completely within a single processor, the output of that processor is unloaded to a particular processor in the next layer. If a subsequent sentence should extend over more than one processor, the output of all those processors containing data from a single sentence would be directed to the next processor in line. As a result, each processor in layer 2 contains one sentence from the layer 1 data.

Since a short time is necessary to process (e.g. parse) a short sentence and a longer time is required to process a long sentence, if processing has not been completed by the time to reload a processor of the second layer, processing will be transferred to a processor in a third layer and subsequent layers as needed.

What has been disclosed is a multi-processor computing system which has a flexible architecture and which permits the processing of intensive amounts of data which are received on a continuous basis. The architecture permits processing power to be incrementally increased by adding processors to each layer or by increasing the number of layers. The architecture has particular application to vector and matrix processing to image processing, to intensive transaction oriented database processing and to text processing.

However, these are only preferred embodiments and it should be understood that the invention is capable of use in various other combinations and is capable of changes and modifications within the scope of the inventive concept as expressed herein.

What is claimed is:

1. A method of operating a multi-processor computing system comprising a plurality of layers, each layer comprising dual ported processors, a plurality of busses, each bus supervised by a supervisory processor, one of said plurality of busses constituting an input bus to processors of the first layer and one of said plurality of busses constituting an output bus and one port of each processor of a first layer connected to said input bus and one port of each processor of a last layer connected to said output bus and one or more intermediate busses connected to one port of processors of a preceding layer and one port of processors of a succeeding layer, comprising:

loading incoming blocks of data sequentially to respective processors of said first layer for processing, and loading to each of said respective processors a copy of a block of data which duplicates a block of data loaded into another processor.

2. A multi-processor computing system comprising:

a plurality of layers, each layer comprising a plurality of dual ported processors, a plurality of busses, each bus supervised by a supervisory processor;

one of said plurality of busses constituting an input bus to processors of a first layer and another of said plurality of busses constituting an output bus, one port of each processor of the first layer connected to said input bus, one port of each processor of a last layer connected to said output bus, one or more intermediate busses connected to one port of processors of a preceding layer and one port of processors of a succeeding layer; and a control mechanism for loading incoming blocks of data sequentially to respective processors of said first layer for processing and for loading to each of said respective processors a copy of a block of data which duplicates a block of data loaded into another processor, wherein incoming data can be allocated to processors of a first layer and transferred sequentially to processors of subsequent layers for processing.

3. A multi-processor computing system as in claim 2, in which:

the supervisory processors are dual ported and a supervisory linking bus is connected to one port of each supervisory processor which is not the supervisory processor of the input bus.

4. A multi-processor computing system as in claim 3, in which mass storage devices are connected to said supervisory linking bus.

5. A multi-processor computing system as in claim 2, in which:

data is input to said input bus via a data input controller connected to the supervisory processor of said input bus, data is output from said last bus via an output controller, and the output controller is connected to the input controller so that the output data can be selectively directed to the input controller.

6. A multi-processor computing system as in claim 2, in which the supervisory processor of each bus connected to layer processors sequentially loads data into the memory of respective layer processors.

7. A multi-processor computing system as in claim 6, in which the operating state of a processor of one layer is transferred as required to a processor of a subsequent layer for continuation of processing.

8. A multi-processor computing system as in claim 6, in which the operating state of a processor of one layer is transferred as required to a processor of a subsequent layer and the processor of the subsequent layer continues processing from the point in program execution at which program execution was interrupted for the transfer.

9. A multi-processor computing system as in claim 2, in which the supervisory processor of each bus connected to layer processors sequentially loads data in duplicate into two processors' memory.

10. A multi-processor computing system as in claim 2, in which each layer processor operates in a sequence of operations comprising a combination of load, process and unload cycles.

11. A multi-processor computing system as in claim 2, in which each layer processor operates in a sequence of operations comprising load, load, process, process, and unload.

12. A multi-processor computing system comprising:

a plurality of layers, each layer comprising a plurality of dual ported layer processors, each layer processor operating in a sequence of operations comprising a combination of load, processing and unload cycles;

a plurality of busses, each bus supervised by a supervisory processor which is dual ported and which is connected to layer processors to sequentially load data into the memory of respective layer processors in duplicate;

one of said plurality of busses constituting an input bus corresponding to the first layer, one of said plurality of busses constituting an output bus, one port of each processor of a first layer connected to said input bus, one port of each processor of a last layer connected to said output bus, and one or more intermediate busses connected to one port of processors of a preceding layer and one port of processors of a succeeding layer;

a data input controller connected to the supervisory processor of said input bus by which data is input to processors of said first layer over said input bus by loading incoming blocks of data sequentially to respective processors of said first layer for processing and by loading to each of said respective processors a copy of a block of data which duplicates a block of data loaded into another processor;

a data output controller connected to the input controller so that the output data can be selectively directed to the input controller and so that data can be output from said last bus via said output controller;

a supervisory linking bus connected to one port of each supervisory processor except the supervisory processor of the input bus; and mass storage devices connected to said supervisory liiking bus;

wherein incoming data can be allocated to processors of a first layer and transferred sequentially to processors of subsequent layers for processing and wherein the operating state of a processor of one layer is transferred as required to a processor of a subsequent layer and the processor of the subsequent layer continues processing from the point in program execution at which program execution was interrupted for the transfer.

13. A multi-processor computing system as in claim 12, in which the supervisory processor of each bus connected to a layer processor sequentially loads a duplicate copy of data to be processed by an adjacent layer processor of the same layer to said layer processor.

14. A method of operating a multi-processor computing system comprising a plurality of layers, each layer comprising dual ported processors, a plurality of busses, each bus supervised by a supervisory processor, one of said plurality of busses constituting an input bus corresponding to the first layer and one of said plurality of busses constituting an output bus and one port of each processor of a first layer connected to said input bus and one port of each processor of a last layer connected to said output bus and one or more intermediate busses connected to one port of processors of a preceding layer and one port of processors of a succeeding layer, comprising:

loading incoming data sequentially to processors of said first layer for processing by loading incoming blocks of data sequentially to respective processors of said first layer for processing and by loading to each of said respective processors of said first layer a copy of a block of data which duplicates a block of data loaded into another processor, transferring the operating state of each processor of said first layer to a corresponding processor of a subsequent layer if incoming data is ready to be loaded to said processor of said first layer and processing has not been completed, and operating the corresponding processor of the subsequent layer to resume processing beginning with the operating state received from the processor of said first layer, whereby incoming data can be allocated to processors of a first layer and transferred sequentially to processors of subsequent layers for processing.

* * * * *